United States Patent [19]
Herbert, Jr.

[11] 3,891,963
[45] June 24, 1975

[54] CODED RADIO SHOOTING UNIT

[75] Inventor: Curtis B. Herbert, Jr., Houston, Tex.

[73] Assignee: Exxon Production Research Company, Houston, Tex.

[22] Filed: Oct. 23, 1973

[21] Appl. No.: 408,695

[52] U.S. Cl..... 340/15.5 TS; 340/16 C; 343/6.5 SS; 325/32
[51] Int. Cl............................................. G01v 1/14
[58] Field of Search .......... 340/15.5 TS, 16 C, 349; 343/6.5 SS, 6.5 LC; 325/13, 32, 33; 181/15 TS

[56] References Cited
UNITED STATES PATENTS

| | | | |
|---|---|---|---|
| 2,479,772 | 8/1949 | Peterson...................... | 340/15.5 TS |
| 3,062,315 | 11/1962 | Herzog.......................... | 181/.5 TS |
| 3,283,295 | 11/1966 | Montgomery................ | 340/15.5 TS |
| 3,689,885 | 9/1972 | Kaplan et al. ................ | 343/6.8 LC |

FOREIGN PATENTS OR APPLICATIONS

| | | | |
|---|---|---|---|
| 2,117,340 | 10/1971 | Germany...................... | 343/6.8 LC |

Primary Examiner—T. H. Tubbesing
Assistant Examiner—N. Moskowitz

[57] ABSTRACT

Apparatus for activating a seismic explosive charge includes a communications link for permitting two-way communication between a control location and a seismic energy generator or explosive charge location, first and second code generators respectively at the control location and the generator location, and first and second code detectors respectively at the control location and the generator location. A code group is transmitted from the control location to the generator location. Upon being detected at the generator location, the code group is retransmitted back to the control location and simultaneously the code group is again detected at the generator location so as to concomitantly produce detection signals at both the generator location and the control location. At the generator location the detection signal is used to activate the seismic explosive charge and at the control location to generate a time break electrical signal. The first arrivals of seismic energy at a location on the earth's surface substantially vertically above the explosive charge is detected. A counter at the generator location, which is reset whenever a detection signal is generated at the generator location, measures the time interval from the activation of the seismic charge to the detection of the first arrivals. A binary signal indicative of the time interval is transmitted back to the control location where it is recorded or otherwise utilized.

11 Claims, 13 Drawing Figures

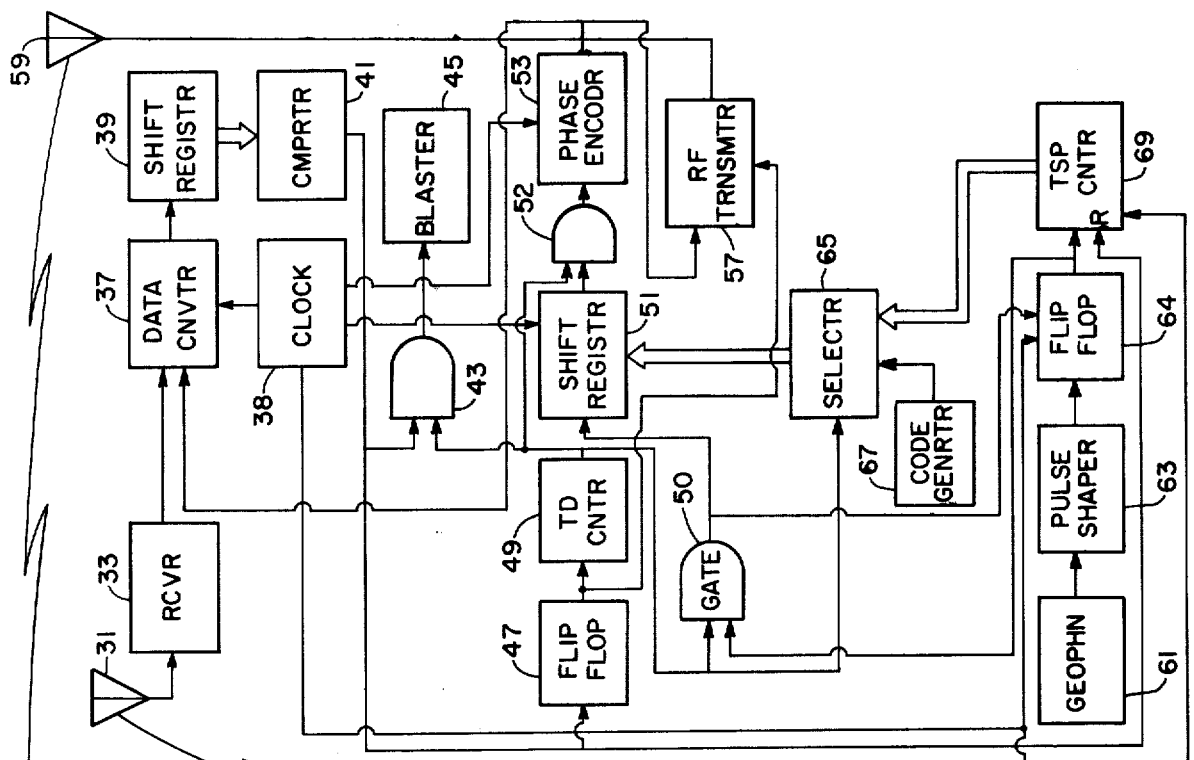
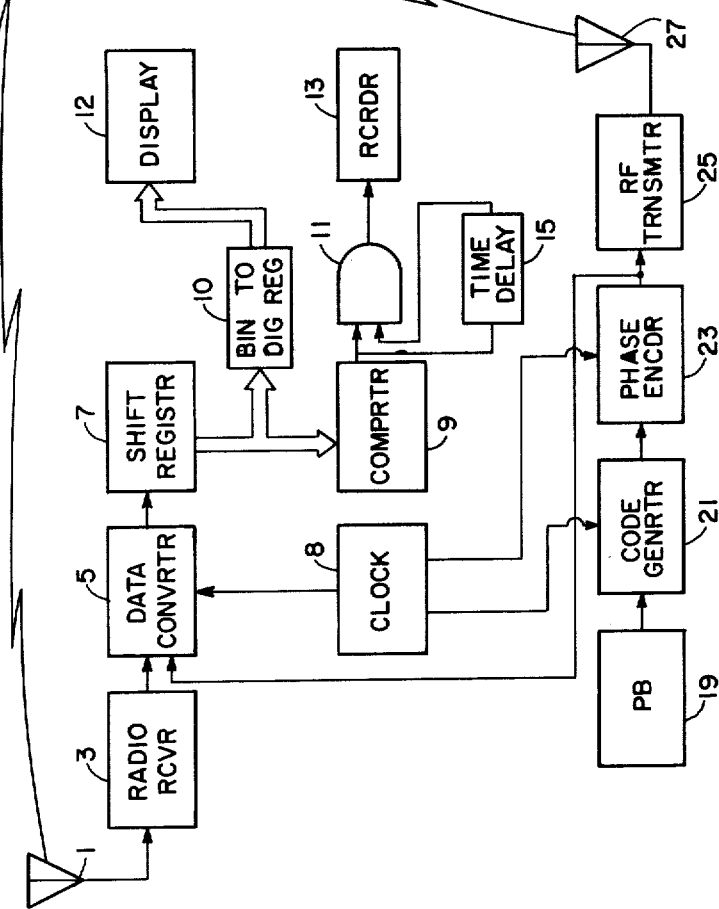
FIG. 1
FIG. 2A
FIG. 2B

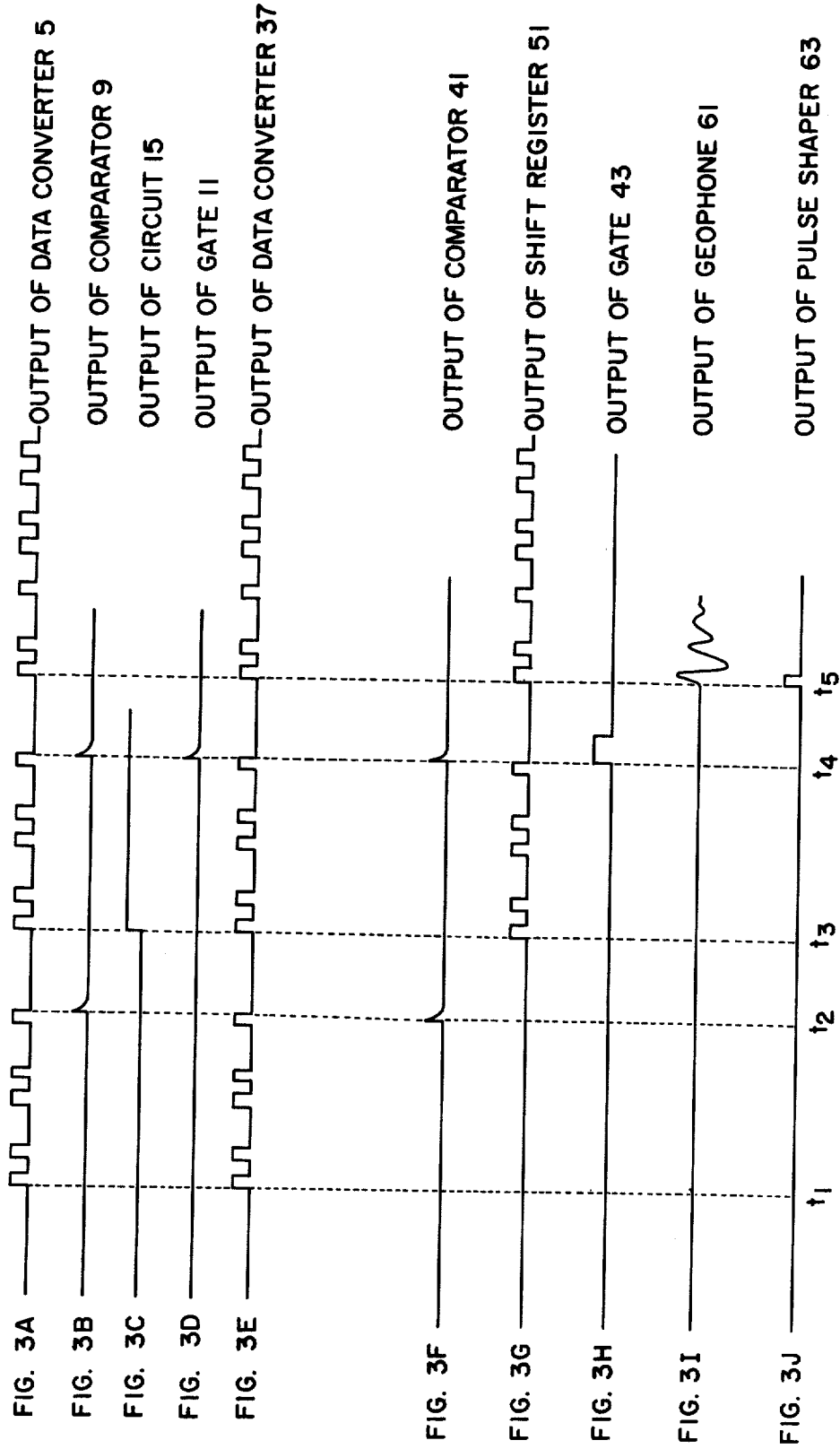

CODED RADIO SHOOTING UNIT

BACKGROUND OF THE INVENTION

This invention relates generally to seismic prospecting and more particularly to activating explosive charges through a communications link from a remote location.

In siesmic prospecting at land locations, the most commonly used energy source for generating seismic waves in the earth is an explosive charge such as dynamite. In the usual technique for handling dynamite, a shot hole is drilled in the earth, the explosive charge is placed at or near the bottom of the shot hole, and the shot hole is suitably tamped with fluid. It is desirable to exercise control over the detonation of the seismic charge from a remote location whereat is located recording equipment for recording electrical signals produced by geophones stationed along the earth's surface at various locations along a traverse extending from the shot hole location. A communications link, preferably a radio link, connects the apparatus at the recording location to the apparatus at the shot hole location. Radio receiving and transmitting equipment are stationed at both the recording and shot hole locations for establishing this communications link. Signals transmitted from the recording location to the shot hole location energize electrical apparatus for activating the seismic charge, as by electrically energizing a dynamite cap.

Manifestly, certain safety precautions must be built in to both the equipment at the control location and the equipment at the shot hole location to prevent inadvertent detonation of the explosive charge while personnel are working at or near the shot hole. The apparatus should also provide for the transmission of certain information back and forth between the two locations such as instant of the detonation of the explosive charge, commonly called the "time break." One piece of information that has not been satisfactorily transmitted from the shot hole location to the control or recording location by prior art apparatus is the time required for seismic waves to travel from the level of the explosive charge to a location at or near the mouth of the shot hole. This time interval, commonly called "TSP," is vital for proper interpretation of seismograms obtained during the course of seismic exploration. Furthermore, in spite of various efforts to make the apparatus as safe and foolproof as possible, instances have occurred when prior art apparatus has been deficient in this respect.

SUMMARY OF THE INVENTION

In accordance with one aspect of the present invention, apparatus for controlling the activation of the seismic energy generator through a communications link between a control location and a generator location includes first means for transmitting a first coded signal from the control location to the generator location through the communications link. There is also provided second means responsive to the first coded signal for transmitting a second coded signal through the communications link from the generator location to the control location. Means also is provided for activating the seismic energy generator responsive to the second coded signal and for measuring the time interval from activation of the seismic energy generator to the arrival of resultant seismic energy from the level of the seismic energy generator in the earth to the earth's surface and for sending a signal indicative of the time interval through the communications link to the control location. There is further provided means for generating time "zero" signal at the control location responsive to the second coded signal.

Objects and features of the invention not apparent from the above discussion will become evident upon consideration of the following description of a preferred embodiment of the invention in connection with the accompanying drawings, which is to be taken in an illustrative sense and not necessarily by way of limitation.

BRIEF DESCRIPTION OF THE DRAWINGS

In the drawings:

FIG. 1 is an electrical schematic diagram of a preferred embodiment of the invention.

FIGS. 2A and 2B are wave form diagrams for the purpose of illustrating the relationship between a pulse coded signal and a phase encoded signal.

FIGS. 3A through 3J are wave form diagrams of signals at various locations in FIG. 1 for the purpose of facilitating and understanding of the operation of the apparatus of FIG. 1.

DESCRIPTION OF THE PREFERRED EMBODIMENT

With reference now to FIG. 1, there is shown an electrical schematic diagram of an operator's control unit for initiating commands to detonate an explosive charge, and a shooters or generator control unit for actually detonating an explosive charge and for performing certain other functions that will become evident. The two units are connected together by a communications link, here illustrated as comprising radio frequency transmitter 25 and an antennae 27 therefor, a radio receiver 3 and an antennae 1 therefor (at the control location), a radio frequency transmitter 57 and an antennae 59 therefor, and a radio receiver 33 and an antennae 31 therefor (at the generator or shooters location). Manifestly, by the use of appropriate switching and control circuits, only one antenna need be used at each location. However, for simplicity of illustration, two antennae are illustrated at each location.

The apparatus at the control location includes a binary code pulse generator 21 under the control of a push button 19 for initiating the operation thereof. The code generator 21 initiates a pulse code sequence under the control of a clock circuit 8. The number of bits in the pulse sequence generated by the generator code 21 is arbitrary. A 12 bit code has been found to be convenient for the purposes of the present invention. The output pulses from the code generator 21 are applied to a phase encoder circuit 23 the function of which is to convert the binary pulse coded output signal of code generator 21 to a phase encoded signal wherein the presence of a pulse at the output of generator 21 is indicated by a pulse signal increasing in amplitude and the absence of a pulse at the output of generator 21 is indicated by a pulse signal decreasing in amplitude. More specifically, and with reference to FIGS. 2A and FIGS. 2B, a pulse coded signal in FIG. 2A and corresponding phase encoded signal in FIG. 2B are shown on the same time scale. The pulse coded signal in FIG. 2A is indicative of a binary number 100100100101. When a binary one is detected by the phase encoder the level of the output signal changes from the lower value to the higher value at said given instant in one time segment. When two zeros in a row are detected, the output signal which is already at the lower level from detection of the first zero is allowed to increase to a higher value and then brought to the lower value within one time segment. Likewise when two binary ones are produced by generator 21, the output signal of the phase encoder which is already at the higher value from detection of the first one is brought to the lower and then to the higher value within one time segment. Phase encoder circuits are well known to the art and are discussed at page 127 of the text "Digital Magnetic Recording" by Albert S. Hoaglund, John Wiley and Sons (1963), and "Operating and Service Manual No. 101399" of Peripheral Equipment Corp. of Chatsworth, Calif.

The output signal of the phase encoder circuit 23 is used to amplitude modulate a radio frequency transmitter 25 for transmission to the shooters unit at the generator station remote from the operator's unit. The output signal of the phase encoder 23 also is applied to a data converter 5, the function of which is to reconvert the phase encoded output signal of circuit 23 into pulse coded form so as to be substantially the same as the output signal of code generator 21. Data convertors also are well known to the art as evidenced by the two references cited above. Also applied to the data converter 5 are the output signals of radio receiver 3, the function of which will be described hereinafter. The output binary pulse train from the data converter 5 is applied to a serial-to-parallel shift register 7, the multiple output lines of which are simultaneously applied to a comparator 9 and to a register 10. In the comparator 9, the code sequence indicated by the various stages of the shift register 7 are simultaneously compared with a code sequence that is hard-wired into the comparator circuit 9 so that when the same code sequence is registered thereby, an output pulse is produced which is applied to the AND circuit 11. The comparator circuit 9 may be any of a number of circuits well known to the art such as described in "Fairchild Semiconductor Linear Integrated Circuits Applications Handbook," by James N. Giles (1967). The output signals from comparator 9 are also applied to time delay circuit 15, the output signals of which are applied to AND circuit 11. The AND circuit 11 will produce an output signal only when comparator 9 produces an output signal a given time interval after a previous output signal is produced thereby. The output of the AND circuit is recorded by recorder 13. For reasons that will become apparent below, the output signals from register 10 are applied to a numerical display device 12, which conveniently may be a light emitting diode type of numerical display well known in the art.

A clock circuit 8 actuates and synchronizes the operation of data converter 5, code generator 21, and phase encoder 23. A plurality of clock output signals are provided as the various circuits operate at different repitition rates. For example, data converter 5 typically operates at 32 kHz, code generator 21 at 2 kHz, and phase encoder 23 at 4 kHz.

The radio frequency signals from transmitter 25 and antennae 27 are detected by antennae 31 and receiver 33, and the output signals are applied to the data converter 37 which may be substantially the same type of device as data converter 5. The function of data converter is to convert the phase encoded signals detected by the receiver 33 into binary pulse coded form as illustrated in FIG. 2A. The pulse coded output signals from the data converter 37 are applied to a serial-to-parallel shift register 39, the output signals of which are applied in parallel to a comparator 41 which is substantially the same as comparator 9. The comparator 41 produces an output signal when the shift register 39 indicates that a code sequence has been received from the data converter 37 that is the same as the code sequence that is built into comparator 41 and to be compared thereby. The output signals from comparator 41 are simultaneously applied to one input circuit of AND circuit 43, to flip-flop 47, and to one of the input circuits of the counter 69. The output signal of flip-flop 47 triggers a time delay counter 49 and also activates radio frequency transmitter 57. The output signals from the time delay counter 49 are applied to the other input circuit of AND circuit 43, the function of which is to produce an output signal only when signals are simultaneously received from comparator 41 and time delay counter 49 (i.e. when comparator 41 produces an output signal a predetermined time interval after it previously produces an output signal). The output signal of 43 activates a blaster control circuit 45, the function of which is to supply detonating current to an explosive charge. The blaster control circuit 45 may be a silicon controlled rectifier circuit such as is well known to the art for this purpose.

The output of the time delay counter 49 also is applied to a selector circuit 65 and to one input of an AND circuit 50. The selector circuit 65 functions selectively to load a parallel output count produced by code generator 67 into a shift register 51, or to load the output of a counter circuit 69 into the shift register 51. The selector circuit 65 may be an RCA COS/MOS 4019 integrated circuit, in which case the code generator 67 will form part of the selector circuit by connecting appropriate terminals of the integrated circuit either to ground or to a voltage of given magnitude in a manner well known to the art. The function of the counter 69 is to provide a parallel binary digital output count indicative of the time interval between the substantially simultaneous production of an output signal by comparator 41 and activation of blaster 45, and production of an output signal by geophone 61 (which geophone is stationed at the earth's surface substantially vertically above the seismic charge). The initial output signals from geophone 61 are applied to a pulse shaper 63, the function of which is to provide a single output pulse upon activation of signals of predetermined magnitude from geophone 61. The signals from pulse shaper 63 are applied to the flip-flop 64, the output pulse of which is simultaneously applied to counter 69 and to AND circuit 50. The AND circuit 50 produces an output signal upon simultaneous reception of a signal from time delay counter 49 and a signal from flip-flop 64 to activate a shift register 51. The output signals from the shift register 51 are applied to a phase encoder 53 through AND circuit 52. AND circuit 52 is activated by the output signal from time delay counter 49 so as to permit passage of signals from code generator 51 to phase encoder generator 53. The binary output signals from the phase encoder 53 are simultaneously applied to data converter 37 and to the radio frequency transmitter 57 for transmission to the radio receiver 3.

A multiple output clock circuit 38 activates and synchronizes the operation of data converter 37, flip-flop 64 (and TSP counter 69), shift register 51, and phase encoder 53. Typically, data converter 37 operates at 32 kHz, counter 69 at 1 kHz, shift register 51 at 2 kHz, and phase encoder 53 at 4 kHz.

The operation of the apparatus of FIG. 1 will now be described with reference to the wave forms of FIGS. 3A to 3J. Initially, push button 19 is depressed to activate the code generator 21. Beginning at time $t_1$ the code generator 21 will produce a binary digital pulse output signal as indicated in FIG. 3A. This signal is applied to phase encoder 23 and the phase encoded signal is simultaneously applied to transmitter 25 and data converter 5. The phase encoded signal is received by receiver 33 and applied to data converter 37 whereat it is converted back into pulse coded form so as to be substantially the same as the signal at the output of code generator 21. The pulse train at the output of the data converter 37 (the output of data converter 37 is indicated by FIG. 3E) is applied to shift register 39. When the shift register is filled with the data code, an output pulse will be produced by comparator 41 which is illustrated by the pulse in FIG. 3F at time $t_2$. This signal is applied simultaneously to flip-flop 47 and to the TSP counter 69. The flip-flop 47 turns on transmitter 57 and activates the time delay counter 49 which times out a predetermined interval after which interval a pulse is produced thereby which is applied simultaneously to AND circuit 43 and to selector circuit 65. This occurs at time $t_3$ in FIG. 3. The pulse applied to selector 65 activates the selector so that it produces a pulse code sequence substantially identical to that produced by generator 21. This pulse code sequence begins at time $t_3$ in FIG. 3G. The code produced by selector 65 applied to shift register 51 and the pulse train from shift register 51 is transmitted through gate 52 and phase encoder 53 and modulates the radiofrequency transmitter 57. The signal produced by transmitter 57 is transmitted to antenna 1 and ratio receiver 3.

While the foregoing has been taking place, the phase encoded signal produced by phase encoder 23 is applied to data converter 5 whereat it is reconverted to pulse coded form and applied to shift register 7. When the shift register is loaded by coded data pulses, the comparator 9 will produce an output signal which is indicated by the first pulse of FIG. 3B. This signal is applied to time delay circuit 15 and also applied to AND circuit 11. However, since no signal is simultaneously applied to the AND circuit 11 by time delay circuit 15 no signal is recorded by recorder 13. The time delayed output signal from time delay circuit 15 is indicated by FIG. 3C. At time $t_3$ the signal transmitted to the receiver 3 from transmitter 57 is received and applied through the data converter 5 to the shift register 7. The output of the data converter 5 is indicated by the second pulse train extending from the time interval $t_3$ to $t_4$ in FIG. 3A. At the same time that the shift register 7 is being loaded by pulses from data converter 5, the signals produced by phase encoder 53 are applied to data converter 37 so that a substantially concomitant and identical pulse train appears simultaneously at the outputs of data converters 5 (see FIG. 3A) and 37 (see FIG. 3E). When the shift register 39 is loaded, an output signal is produced by comparator 41 (see FIG. 3F) which is substantially concomitant with the output signal produced by comparator 9. This signal is applied to AND circuit 43 slightly after time delay counter 49 applies a signal to AND circuit 43. As a result of the coincidence of such signals, the blaster circuit 45 is energized to detonate the explosive charge. At the same time that AND circuit 43 produces an output signal, AND circuit 11 also produces an output signal as shown in FIG. 3D since the time delayed output of time delay circuit 15 is applied to AND circuit 11 concomitantly with the production of an output pulse from comparator 9. Therefore, a recording is made on recorder 13 at the same time that the explosive charge is detonated. The output pulse from AND circuit 43 is indicated by FIG. 3H.

Let it be assumed that the time interval from time $t_4$ to time $t_5$ is required for energy from the explosive charge to be detected by the TSP geophone 61. At time $t_4$ the output signal from comparator 41 is applied to the TSP counter 64 to begin its timing operation. At time $t_5$ the output signal from the TSP geophone 61 (FIG. 3I) will produce an output pulse from pulse shaper 63 (FIG. 3J) that is applied through flip-flop 64 to TSP counter 69 to stop the timing operation of the TSP counter. The output pulse from flip-flop 64 also is applied to AND circuit 50 concomitantly with the time delayed signal from time delay counter 49 to activate the shift register 51. The output signal from time delay counter 49 is also applied to selector 65 to unload the TSP counter 69 into the shift register 51. Shift register 51 is clocked into the phase encoder 53 through AND circuit 52 and a binary signal indicative of the time interval counted by counter 69 is transmitted by transmitter 57 to antenna 1 and radio receiver 3. This signal is reconverted into pulse coded form as indicated by the pulse code beginning at time $t_5$ in FIG. 3G. The pulses are applied through the shift register 7 to parallel lines connected to a binary-to-digital register 10 from which they are applied to the light-emitting diode numerical display 12 so that the operator is immediately appraised of the time required for seismic waves to travel from the explosive charge to the earth's surface.

I claim:

1. Apparatus for controlling the activation of a seismic energy generator through a communications link between a control location and a generator location, comprising:

first means for transmitting a first coded signal from the control location to the generator through the communications link;

second means responsive to the first coded signal for transmitting a second coded signal through the communications link from the generator location to the control location;

third means for activating the seismic energy generator response to the second coded signal, for measuring the time interval from activation of the seismic energy generator to the arrival of resulting seismic energy from the level of the seismic generator in the earth to the earth's surface and for sending a signal indicative of said time interval through the communications link to said control location; and fourth means for generating a time zero signal at the control location responsive to the second coded signal.

2. The apparatus of claim 1 wherein said first means comprises a binary code generator, and phase encoder means connected to the binary code generator for generating of phase encoded binary signals responsive to the output signal of said binary code generator.

3. The apparatus of claim 1 wherein said third means includes time delay means for delaying activation of said generator means for a predetermined interval, and said fourth means includes time delay means for insuring generation of said time zero signal concomitantly with activation of said generator.

4. The apparatus of claim 1 wherein said third means comprises seismic energy detector means for detecting the arrival of seismic energy at the earth's surface and for producing an output signal responsive thereto; time interval counter means responsive to an activating signal for beginning an interval count and responsive to the output signal of said seismic energy detecting means to terminate the interval count; and code signal detecting means for detecting said second coded signal to produce said activating signal for said time interval counter means.

5. The apparatus of claim 4 wherein said second means further includes means for transmitting the interval count measured by said time interval counting means to said first means for recording thereat.

6. A system for control of the detonation of a seismic explosive in a shot hole through a communications link between a control location and a shot hole location comprising:
   a. first means for transmitting a first coded signal from the control location to the shot hole location through the communications link;
   b. second means responsive to the first coded signal for generating a second coded signal;
   c. third means for detonating the seismic explosive at the end of the second coded signal and for measuring the time interval from detonation of the seismic explosive to arrival of resulting seismic energy near the upper terminus of the shot hole;
   d. fourth means for transmitting the second coded signal and a signal indicative of the measured time interval through the communications link from the shot hole location to the control location; and
   e. fifth means for generating a time zero signal at the control location responsive to the second coded signal.

7. The apparatus of claim 6 wherein said first means includes: binary code generator means; and phase encoder means connected to the binary code generator means for generating a phase encoded binary signal responsive to the output signal of said binary code generator.

8. The apparatus of claim 6 wherein said third means includes time delay means for delaying activation of said generator means for a predetermined interval, and said fifth means includes time delay means for insuring generation of said time zero signal concomitantly with activation of said binary code generator.

9. The apparatus of claim 6 wherein said third means comprises: seismic energy detector means for detecting arrival of seismic energy at the earth's surface and producing an output signal responsive thereto; time interval counter means responsive to an activating signal for beginning a time interval count and responsive to the output signal of said seismic energy detecting means to terminate the time interval count; and means for detecting said second coded signal to produce said activating signal for said time interval counter means.

10. Apparatus for controlling the activation of a seismic energy source between a control location and a source location, comprising:
    a data communications link for establishing two-way communications between the control location and the source location;
    first data generator means for producing a digital code signal for transmission from the control location to the source location;
    first circuit means connected to said first code generator means and to said communications link for producing an output signal when either the code signal from said code generator or a code signal received from the source location through the communications link corresponds to a reference code;
    means for recording said output signal of said first circuit means when two output signals are produced thereby separated by a given time interval;
    second circuit means for receiving signals at the source location end of said communications link for producing a second output signal when the code signal received thereby corresponds to said reference code;
    third circuit means for producing a third output signal, said given time interval after production of a signal by said second circuit means;
    fourth circuit means for producing an activating signal for said source upon simultaneous production of output signals by said second and third circuit means;
    second code generator means responsive to said third output signal to produce a second digital code signal corresponding to the digital code signal produced by said first code generator means, said second digital code signal being applied to said communications link for transmission to said control location and simultaneously applied to said second circuit means for production of a second output signal thereby.

11. The apparatus of claim 10 further including:
    seismic energy detecting means for detecting seismic energy at a location above the source;
    counter means for producing a digital stand indicative of the time interval between production of a second output signal by said second circuit means and detection of signals of at least a given amplitude by said detecting means;
    said second code generation means being adapted to couple said counter means to said communications link for transmission to said control location of the digital signal originated by said counter means; and
    means at said control location for recording signals originated by said counter means.

* * * * *